United States Patent
Tanaka et al.

(10) Patent No.: US 11,879,772 B2
(45) Date of Patent: Jan. 23, 2024

(54) STRUCTURE DETERIORATION DETECTION SYSTEM FOR MAKING A DETERMINATION ABOUT WHETHER DETERIORATION HAS OCCURRED

(71) Applicant: NEC Corporation, Tokyo (JP)

(72) Inventors: Akihiro Tanaka, Tokyo (JP);
Tomoyuki Hino, Tokyo (JP);
Chaitanya Prasad Narisetty, Tokyo (JP)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 17/438,997

(22) PCT Filed: Mar. 26, 2019

(86) PCT No.: PCT/JP2019/012771
§ 371 (c)(1),
(2) Date: Sep. 14, 2021

(87) PCT Pub. No.: WO2020/194494
PCT Pub. Date: Oct. 1, 2020

(65) Prior Publication Data
US 2022/0155138 A1    May 19, 2022

(51) Int. Cl.
*G01H 9/00* (2006.01)
*B61L 23/04* (2006.01)
*E01C 23/01* (2006.01)

(52) U.S. Cl.
CPC ............ *G01H 9/004* (2013.01); *B61L 23/042* (2013.01); *E01C 23/01* (2013.01)

(58) Field of Classification Search
None
See application file for complete search history.

(56) References Cited

U.S. PATENT DOCUMENTS

| | | | |
|---|---|---|---|
| 2018/0045556 A1* | 2/2018 | Imagawa | G06V 20/588 |
| 2018/0342156 A1* | 11/2018 | Martin | G08G 1/052 |
| 2019/0120663 A1* | 4/2019 | Suzaki | H04B 10/85 |

FOREIGN PATENT DOCUMENTS

| | | | |
|---|---|---|---|
| JP | 2000-249548 | | 9/2000 |
| JP | 2000249548 | * | 9/2000 |

(Continued)

OTHER PUBLICATIONS

Ishikawa Yuji et al., "Catch bridge anomalies instantly! Development of bridge monitoring system(BRIMOS)", NTT Technical Journal, vol. 21, No. 9, Sep. 2009, pp. 26-29 (Year: 2009).*

(Continued)

*Primary Examiner* — Brandi N Hopkins
*Assistant Examiner* — Nigel H Plumb
(74) *Attorney, Agent, or Firm* — Sughrue Mion, PLLC (57) ABSTRACT

A structure deterioration detection system includes an optical fiber cable that is placed along the longitudinal direction of a structure and continuously detects any vibration along the longitudinal direction of the structure, and a signal processing unit including a vibration measurement unit that measures the strength of a detected vibration, a per unit time integration unit that integrates the vibration strength for a specified period of time, an information storage unit that stores the integrated vibration strength, and a deterioration determination unit that makes a determination about whether deterioration of the structure has occurred by comparing the integrated vibration strengths at different times.

12 Claims, 10 Drawing Sheets

(56) References Cited

FOREIGN PATENT DOCUMENTS

| | | |
|---|---|---|
| JP | 2018-059896 | 4/2018 |
| WO | 2017/072505 A1 | 5/2017 |
| WO | 2017/179431 | 10/2017 |

OTHER PUBLICATIONS

Mizuno Yosuke, "Single-end-access real-time distributed optical fiber sensing", Telecom Frontier No. 94, Feb. 20, 2017, pp. 1-6 (Year: 2017).*

International Search Report for PCT Application No. PCT/JP2019/012771, dated Jun. 18, 2019.

Mizuno Yosuke, "Single-end-access real-time distributed optical fiber sensing", Telecom Frontier No. 94, Feb. 20, 2017, pp. 1-6.

Ishikawa Yuji et al., "Catch bridge anomalies instantly! Development of bridge monitoring system(BRIMOS)", NTT Technical Journal, vol. 21, No. 9, Sep. 2009, pp. 26-29.

* cited by examiner

STRUCTURE DETERIORATION DETECTION SYSTEM FOR MAKING A DETERMINATION ABOUT WHETHER DETERIORATION HAS OCCURRED

This application is a National Stage Entry of PCT/JP2019/012771 filed on Mar. 26, 2019, the contents of all of which are incorporated herein by reference, in their entirety.

TECHNICAL FIELD

The present invention relates to a structure deterioration detection system and a structure deterioration detection method.

BACKGROUND ART

As the era of IoT (Internet of Things), which is called the Fourth Industrial Revolution, has arrived, a vast number of sensors spread across the world, and the number of sensors used annually is expected to exceed one trillion in 2022. Social value creation is achieved with the sensors that acquire real-world data, a communication network that transmits acquired data to a central monitoring unit, an analysis means for processing the collected data and thereby converting the data into valuable information, and a control means for giving some feedback of analysis results to the real world. For example, by constantly monitoring tunnels, bridges and the like, which have been inspected by patrol staff, with sensors and taking measures such as repair upon finding defects or a sign of defects, the manpower required for patrol inspection is significantly reduced. In this value creation process, allocation of power supplies for driving sensors and communication networks is an issue when spreading an indefinite number of sensors around the real world.

Figure 10:
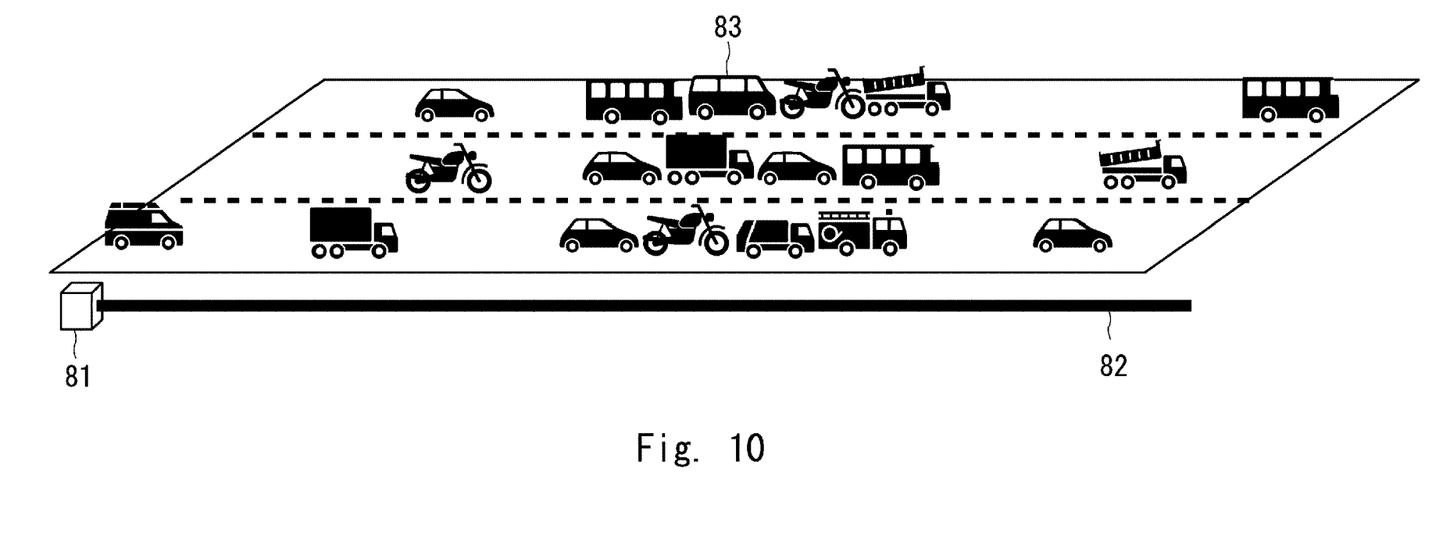
FIG. 10 is a view illustrating an exploration device that sends out an optical signal to an optical fiber cable.

To address this issue, fiber sensor technology is a means that eliminates the need for a power supply at a sensing part and also for a communication network for transferring acquired information. In fiber sensor technology, an optical signal is sent out to an optical fiber cable 82 by an exploration device 81 as shown in FIG. 10, so that information such as vibration and temperature is continuously measured along the optical fiber cable 82. Since the optical fiber cable 82 serves as a sensing medium, a power supply is not required at a sensing part, and since the optical fiber cable 82 serves as a transmission medium of an optical signal, there is no need to prepare an additional communication network.

In relation to this fiber sensor technology, Patent Literature 1 proposes a method of monitoring the traffic of vehicles 83 on a road by using the optical fiber cable 82 laid along the road. The vibration generated by the vehicles 83 passing through the road is detected by a fiber sensor using the optical fiber cable 82, which allows continuously monitoring the travelling direction and the travelling speed of the vehicles 83 and the traffic congestion along the road.

CITATION LIST

Patent Literature

PTL1: International Patent Publication No. WO2017/072505

SUMMARY OF INVENTION

Technical Problem

Although Patent Literature 1 discloses a method of monitoring the traveling situation of the vehicles 83, it does not disclose a method of constantly monitoring the soundness of a road as public transportation infrastructure. Therefore, the occurrence of defects of a road is recognizable only after detecting a phenomenon that the damage of the road becomes worse and the travelling speed of all the vehicles 83 locally decreases or the vehicles 83 become unable to travel. It is therefore desirable to monitor the deterioration of a structure such as a road at low cost.

In view of the above problem, an object of the present disclosure is to provide a structure deterioration detection system and a structure deterioration detection method capable of detecting the deterioration of a structure at low cost.

Solution to Problem

A structure deterioration detection system according to one example embodiment includes a sensor unit placed along a longitudinal direction of a structure and configured to continuously monitor the structure to detect any vibration along the longitudinal direction of the structure, and a signal processing unit including a measurement unit configured to measure a strength of a detected vibration, an integration unit configured to integrate the strength for a specified period of time, a storage unit configured to store the integrated vibration strength, and a determination unit configured to make a determination about whether deterioration of the structure has occurred by comparing the integrated vibration strengths at different times.

A structure deterioration detection method according to one example embodiment includes a step of continuously monitoring a structure to detect any vibration along a longitudinal direction of the structure by a sensor unit placed along the longitudinal direction of the structure, and a step of processing a detected vibration, wherein the step of processing the detected vibration includes a step of measuring a strength of the detected vibration by a measurement unit, a step of integrating a measured vibration strength for a specified period of time by an integration unit, a step of storing an integrated vibration strength by a storage unit, and a step of making a determination about whether deterioration of the structure has occurred by comparing integrated vibration strengths at different times by a determination unit.

Advantageous Effects of Invention

According to one example embodiment, there are provided a structure deterioration detection system and a structure deterioration detection method capable of detecting the deterioration of a structure at low cost.

DESCRIPTION OF EMBODIMENTS

First Example Embodiment

Figure 1:
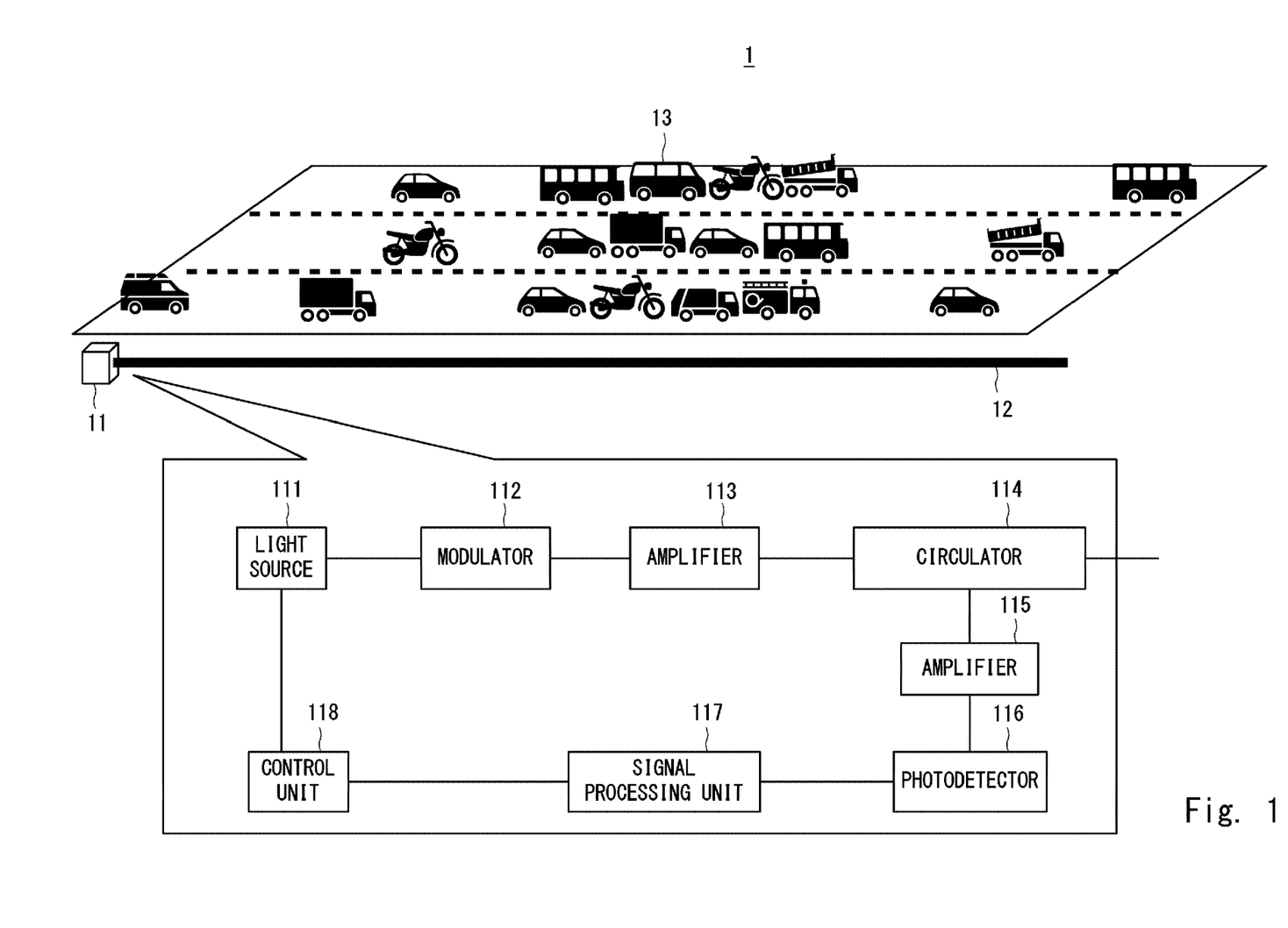
FIG. 1 is a block diagram illustrating the configuration of a structure deterioration detection system according to a first example embodiment.
Figure 2:
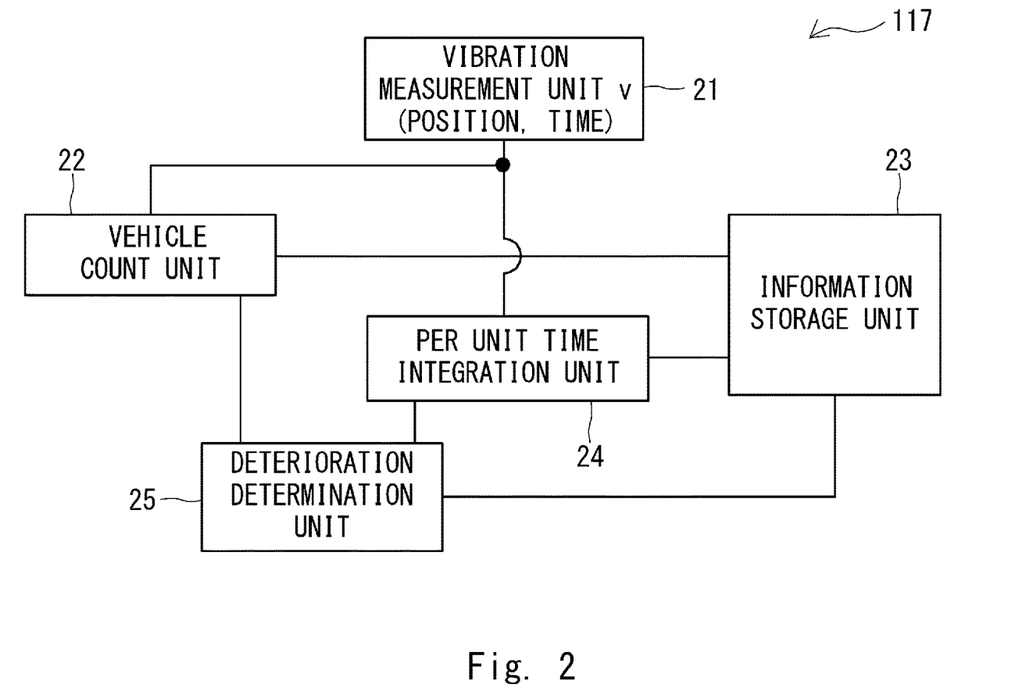
FIG. 2 is a block diagram illustrating the configuration of a signal processing unit in the structure deterioration detection system according to the first example embodiment.
Figure 3:
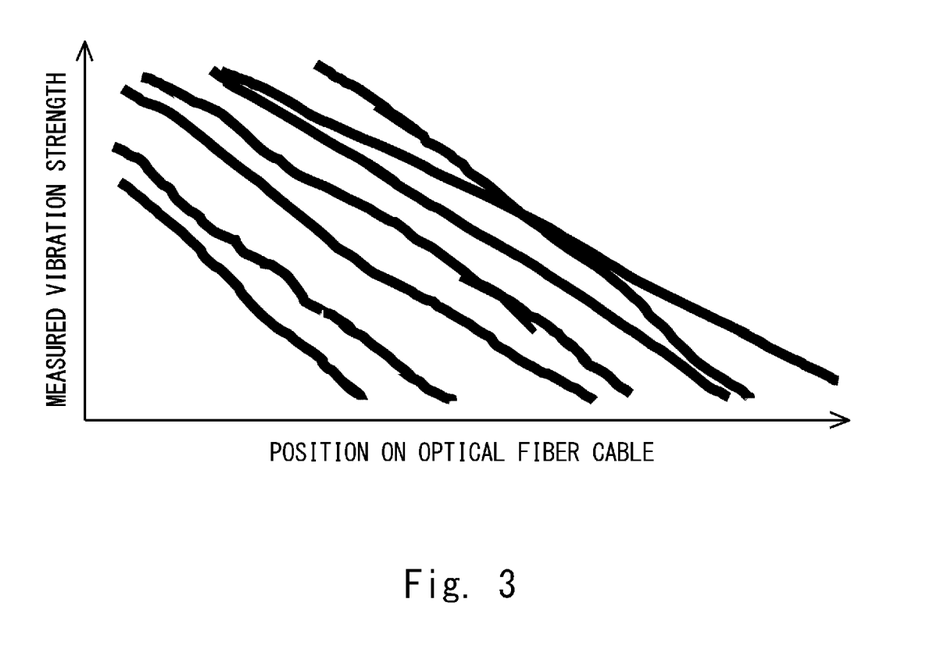
FIG. 3 is a conceptual diagram illustrating signals measured in the structure deterioration detection system according to the first example embodiment, where the horizontal axis indicates a position on an optical fiber cable, and the vertical axis indicates the vibration strength measured with the lapse of time.
Figure 4:
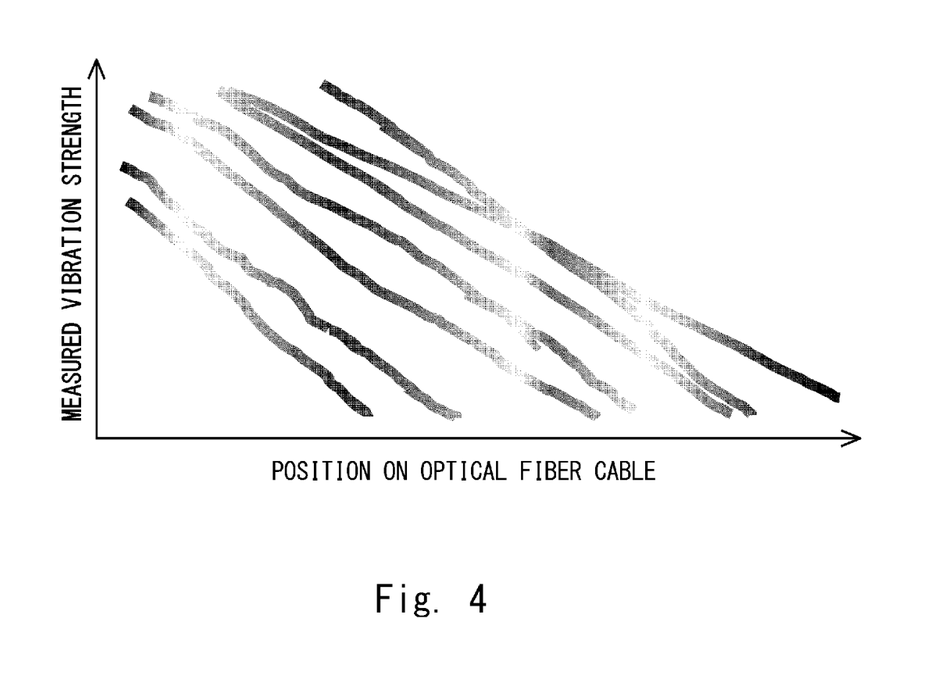
FIG. 4 is a conceptual diagram illustrating signals measured in the structure deterioration detection system according to the first example embodiment, where the horizontal axis indicates a position on an optical fiber cable, and the vertical axis indicates the vibration strength measured with the lapse of time.
Figure 5:
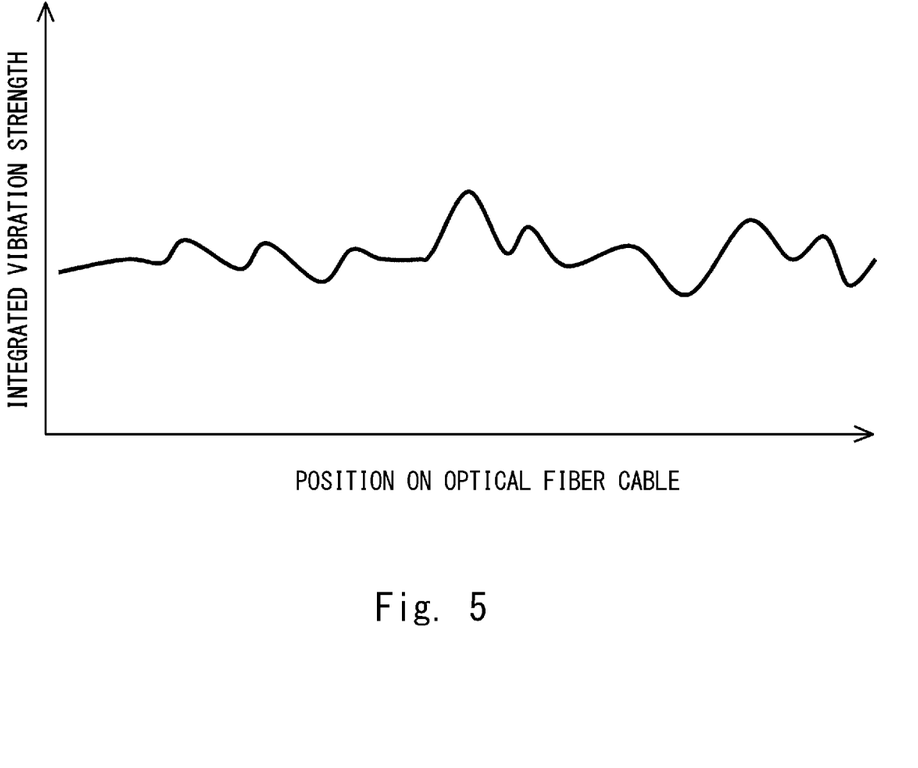
FIG. 5 is a graph showing an integrated vibration strength in the structure deterioration detection system according to the first example embodiment, where the horizontal axis indicates a position on an optical fiber cable, and the vertical axis indicates the integrated vibration strength.
Figure 6:
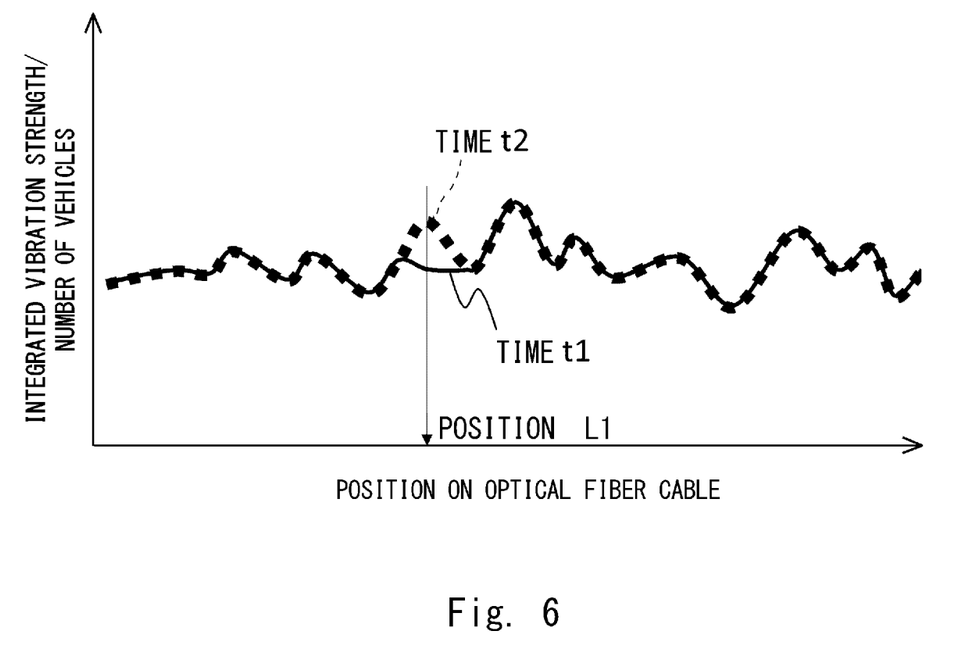
FIG. 6 is a graph showing an integrated vibration strength standardized by the number of passing vehicles in the structure deterioration detection system according to the first example embodiment, where the horizontal axis indicates a position on an optical fiber cable, and the vertical axis indicates the integrated vibration strength/the number of vehicles.
Figure 7:
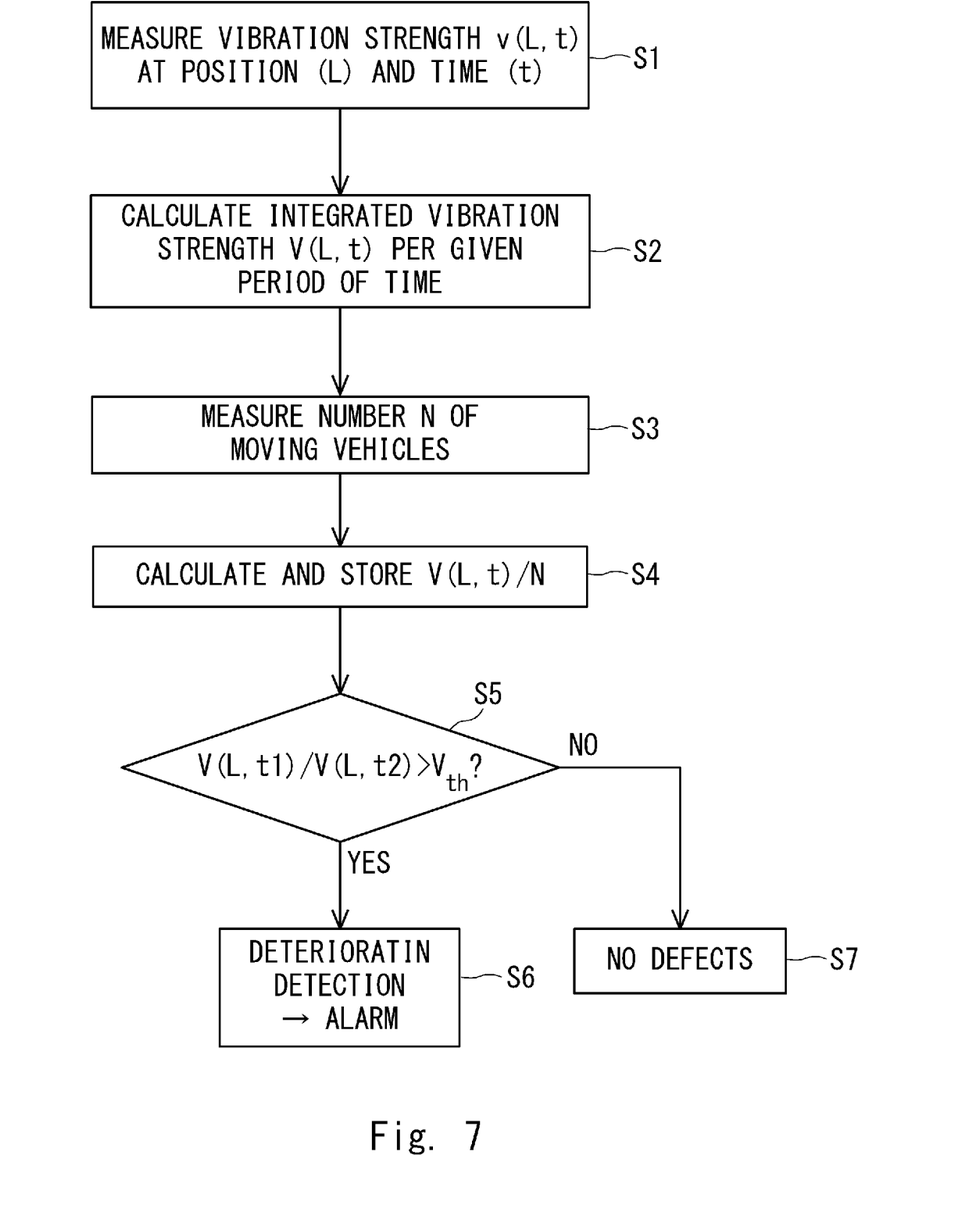
FIG. 7 is a flowchart illustrating a structure deterioration detection method according to the first example embodiment.

A structure deterioration detection system according to a first example embodiment is described hereinafter with reference to FIGS. 1 to 7. FIG. 1 is a block diagram illustrating the configuration of the structure deterioration detection system according to the first example embodiment. FIG. 2 is a block diagram illustrating the configuration of a signal processing unit in the structure deterioration detection system according to the first example embodiment. FIGS. 3 and 4 are conceptual diagrams illustrating signals measured in the structure deterioration detection system according to the first example embodiment, where the horizontal axis indicates a position on an optical fiber cable, and the vertical axis indicates the vibration strength measured with the lapse of time. FIG. 5 is a graph showing an integrated vibration strength in the structure deterioration detection system according to the first example embodiment, where the horizontal axis indicates a position on an optical fiber cable, and the vertical axis indicates the integrated vibration strength. FIG. 6 is a graph showing an integrated vibration strength standardized by the number of passing vehicles in the structure deterioration detection system according to the first example embodiment, where the horizontal axis indicates a position on an optical fiber cable, and the vertical axis indicates the integrated vibration strength/the number of vehicles. FIG. 7 is a flowchart illustrating a structure deterioration detection method according to the first example embodiment.

As shown in FIG. 1, a structure deterioration detection system 1 according to this example embodiment includes an exploration device 11 and an optical fiber cable 12. The exploration device 11 is connected to the optical fiber cable 12 that is laid along a road. The exploration device 11 continuously measures, along the road, the vibration generated by vehicles 13 passing through the road.

The optical fiber cable 12 is a single mode fiber cable that is laid for use in communications, for example. The optical fiber cable 12 functions as a sensor unit that detects the vibration of a road. The optical fiber cable 12 is laid along the longitudinal direction of a structure such as a road extending in the longitudinal direction. The optical fiber cable 12 detects the vibration generated when at least one moving body is moving along a structure. The moving body is the vehicle 13, for example. The optical fiber cable 12 continuously monitor the structure to detect any vibration along the longitudinal direction of the structure. Further, the optical fiber cable 12 continuously detects the vibration with the lapse of time.

The exploration device 11 includes a light source 111, a modulator 112, an amplifier 113, a circulator 114, an amplifier 115, a photodetector 116, a signal processing unit 117, and a control unit 118. The light source 111 generates continuous light with a wavelength of 1.5 µm, for example. The modulator 112 generates pulse light from the continuous light generated by the light source 111. The amplifier 113 amplifies the intensity of the pulse light generated by the modulator 112. The circulator 114 sends out the pulse light amplified by the amplifier 113 as an optical signal to the optical fiber cable 12, and also guides return light arising from backscattering that occurs in the optical fiber cable 12 as an optical signal to the amplifier 115 and the photodetector 116. The amplifier 115 amplifies the optical signal from the optical fiber cable 12. The photodetector 116 converts the optical signal into an electrical signal. The signal processing unit 117 processes the converted electrical signal. The control unit 118 controls each part of the light source 111.

As shown in FIG. 2, the signal processing unit 117 includes a vibration measurement unit 21, a vehicle count unit 22, an information storage unit 23, a per unit time integration unit 24, and a deterioration determination unit 25.

The vibration measurement unit 21 constantly monitors variations in electrical signal, for example. The vibration measurement unit 21 specifies which position in the optical fiber cable 12 an optical signal component received at a specific time is from on the basis of a time difference between the time of sending out and the time of receiving pulse light and the propagation velocity of an optical signal in the optical fiber cable 12. Since an optical pulse is sent out on a periodic basis, the vibration measurement unit 21 measures variations in the intensity of return light from each part in the optical fiber cable 12. Then, the vibration measurement unit 21 measures the level of vibration acting on the optical fiber cable 12 in each part on the basis of variations in the intensity of return light. For example, the vibration measurement unit 21 measures a vibration strength v as a function of a position on the optical fiber cable 12 and time. In this manner, the vibration measurement unit 21 measures the vibration strength v detected by the optical fiber cable 12.

The per unit time integration unit 24 integrates the measured vibration strength for a specified period of time such as a given period of time, for example. For example, the per unit time integration unit 24 integrates the vibration strength at each position measured by the vibration measurement unit 21 for a given period of time and thereby acquires an integrated vibration strength v. The vehicle count unit 22 measures the number of moving vehicles that are moving on the road.

The information storage unit 23 stores the integrated vibration strength integrated by the per unit time integration unit 24. Further, the information storage unit 23 stores the number of moving vehicles measured by the vehicle count unit 22. In this manner, the information storage unit 23 stores an integration result of the per unit time integration unit 24 and a measurement result of the vehicle count unit 22. The deterioration determination unit 25 makes a determination about the deterioration of a structure on the basis of information stored in the information storage unit 23, such as an integration result of the per unit time integration unit 24 and a measurement result of the vehicle count unit 22. The deterioration determination unit 25 makes a determination about whether deterioration of the structure has occurred by comparing the integrated vibration strengths at different times, for example.

The operation of the structure deterioration detection system 1 according to this example embodiment is described hereinafter. The continuous light generated by the light source 111 is modulated into pulse light by the modulator 112. The modulated pulse light is amplified by the amplifier 113, and then sent out as an optical signal to the optical fiber cable 12 through the circulator 114.

In the optical fiber cable 12, an optical signal is scattered by Rayleigh scattering, which is scattering unique to glass molecules that form a fiber. Part of the scattered optical signal turn into backscattered light and returns to the exploration device 11 from different points in the fiber. The optical signal that has returned to the exploration device 11 is sent to the amplifier 115 through the circulator 114. The return light sent to the amplifier 115 is amplified in its intensity by the amplifier 115, and then photoelectrically converted from the optical signal to an electrical signal by the photodetector 116. The electrical signal obtained in the photodetector 116 is processed by the signal processing unit 117. In this manner, the structure deterioration detection system 1 according to this example embodiment continuously detects vibration along the longitudinal direction of a structure by a sensor unit placed along the longitudinal direction of the structure, and processes the detected vibration.

The signal processing unit 117 constantly measures variations in the electrical signal, for example. As described above, the vibration measurement unit 21 in the signal processing unit 117 specifies which position in the optical fiber cable 12 an optical signal component received at a specific time is from. Then, the vibration measurement unit 21 measures the level of vibration acting on the optical fiber cable 12 in each part on the basis of variations in the intensity of return light.

As shown in FIG. 3, measurement by the vibration measurement unit 21 shows the way the position of each vehicle 13 varies with the lapse of time. The slope of a line in FIG. 3 indicates the speed of each vehicle 13, and a vehicle is moving at a lower speed as the slope is sharper, and it is moving at a higher speed as the slope is shallower.

In FIG. 3, two lines cross at one point. This indicates that one vehicle 13 passes another. The vehicle count unit 22 measures the number of moving vehicles from the number of lines in the graph shown in FIG. 3. In practice, the easiness of propagation of vibration generated by the vehicles 13 differs depending on the laid condition of the optical fiber cable 12.

As shown in FIG. 4, since the easiness of propagation of vibration generated by the vehicles 13 differs depending on the position, a difference in intensity appears in the detected line. For example, in FIG. 4, the lines are blurred at three points on the optical fiber cable 12. Thus, the per unit time integration unit 24 integrates the vibration strength measured at each position for a specified period of time. For example, the specified period of time is a given period of time.

Then, a graph indicating the integrated vibration strength calculated by integrating the vibration strength measured at each position on the optical fiber cable 12 for a given period of time is obtained as shown in FIG. 5. The information storage unit 23 continues to store this integrated vibration strength. The information storage unit 23 also continues to store the number of vehicles measured by the vehicle count unit 22.

As shown in FIG. 6, if the integration time is sufficiently long, the value obtained by standardizing the integrated vibration strength by the number of vehicles passed does not largely vary as long as there is no degradation in the road. On the other hand, when the road is sagging due to road surface deterioration at the position L1, vehicles passing on the sagging road generate larger vibration. The integrated vibration strength per unit number of vehicles before the occurrence (time t1) and after the occurrence (time t2) of sagging of the road largely varies at the position L1. The deterioration determination unit 25 makes a determination about this variation and thereby specifies the position and time where road surface deterioration has occurred.

A process flow of the operation of the above-described structure deterioration detection system 1 is described hereinafter with reference to FIG. 7. As shown in FIG. 7, the vibration measurement unit 21 first measures a vibration strength v(L, t) at a position (L) and time (t) on the optical fiber cable 12 (Step S1).

Next, the per unit time integration unit 24 integrates the vibration strength v(L, t) for a given period of time and thereby calculates an integrated vibration strength V(L, t) (Step S2). Then, the vehicle count unit 22 measures the number of lines in FIGS. 3 and 4 and thereby measures the number N of moving vehicles (Step S3).

After that, an integrated vibration strength V(L, t)/N per unit number of vehicles is calculated and stored into the information storage unit 23 (Step S4).

Then, V(L, t) at different times are compared and it is determined whether a rate of variation is greater than a predetermined threshold Vth (S5). When the rate of variation is greater than the threshold Vth, it is determined that road surface deterioration is detected, and an alarm is raised (S6). When, on the other hand, the rate of variation is smaller than the threshold Vth, it is determined that there are no defects, and the measurement is continued (S7). In this manner, the deterioration determination unit 25 compares the ratio of the integrated vibration strengths at different times with a predetermined threshold. The deterioration determination unit 25 thereby makes a determination about the degradation of the structure.

The effect of this example embodiment is described hereinbelow. The structure deterioration detection system according to this example embodiment includes a sensor unit that is placed along the longitudinal direction of a structure and continuously detects vibration along the longitudinal direction of the structure. This reduces the cost for detecting the deterioration of a structure. For example, although the degradation of a structure such as a road surface is detected mostly by patrol staff, this example embodiment allows constant inspection to be performed by a permanent structure deterioration detection system. This reduces the cost and manpower for patrol tasks.

Further, the structure deterioration detection system according to this example embodiment is capable of sending out an optical signal to the sensor unit such as the optical fiber cable in a permanent manner, so that the sensor unit is always in detection mode. This allows the prompt detection of the occurrence of road surface deterioration. In contrast, in the case of staff patrol inspection, detection of road surface deterioration is performed only with the frequency of patrol. Therefore, vehicles pass through the deteriorated road surface, which causes the degradation to become worse.

Note that the configuration of the example embodiment described above may be modified as appropriate and not limited to the above-described configuration. For example, although the light source 111 generates continuous light, and the modulator 112 generates pulse light in the above description, it is not limited thereto, and the light source 111 and the modulator 112 may be integrated into one device by use of a light source that generates pulse light.

Further, although the amplifier 113 is placed in the subsequent stage of the modulator 112, it is not limited thereto, and the amplifier 113 may be placed in the previous stage of the modulator 112. Further, a Raman amplification light source for amplifying light in the optical fiber cable 12 may be provided.

Although the circulator is used to guide return light arising from backscattering that occurs in the optical fiber cable 12 to the amplifier 115 and the photodetector 116, it is not limited thereto. Instead of the circulator, an unused port may be terminated using an optical coupler.

Although the wavelength of an optical signal to use is 1.5 μm in the above description, it is not limited thereto. Any wavelength may be selected as long as it is in a waveband that propagates through a single mode fiber. Further, although the optical fiber cable is a single mode fiber cable that is generally laid on the side of a road for use in communications in the above description, it is not limited thereto, and a multi-mode fiber cable that is intended for use in short-distance communication may be used. Accordingly, the wavelength of an optical signal to use is not limited to 1.5 μm, and a wavelength suitable for a fiber cable to use may be selected. The cable is not limited to a cable laid for use in communications, and it may be a cable laid for use in monitoring.

In Step S5, the ratio of the integrated vibration strengths at different times is calculated, it is not limited thereto. For example, a difference of the integrated vibration strengths at different times may be calculated. Further, the deterioration determination unit 25 may make a determination about the degradation by comparing the ratio of the integrated vibration strengths at different times at a specified point of measurement with the integrated vibration strengths at different times at another point of measurement. This allows comparison of the degree of degradation at each point of measurement.

Although a method of measuring the integrated vibration strength per unit time and standardizing it by dividing the measured integrated vibration strength by the number of moving vehicles is described above, it is not limited thereto. If a unit of integration time is sufficiently long, the number of moving vehicles during the integration time is regarded as approaching a constant value, and it is necessary to standardize the integrated vibration strength by the number of moving vehicles.

Second Example Embodiment

A structure deterioration detection system according to a second example embodiment is described hereinafter. In the above-described first example embodiment, a method of constantly measuring the time variation of the integrated vibration strength is described. In this example embodiment, measurement data is classified into a plurality of attributes depending on the conditions of measurement, and defect detection is performed by comparison with the past data with the same attribute.

The configuration of the structure deterioration detection system according to the second example embodiment is the same as that in the first example embodiment. The operation of the structure deterioration detection system according to the second example embodiment is the same expect for that of the information storage unit 23 and the deterioration determination unit 25.

Figure 8:
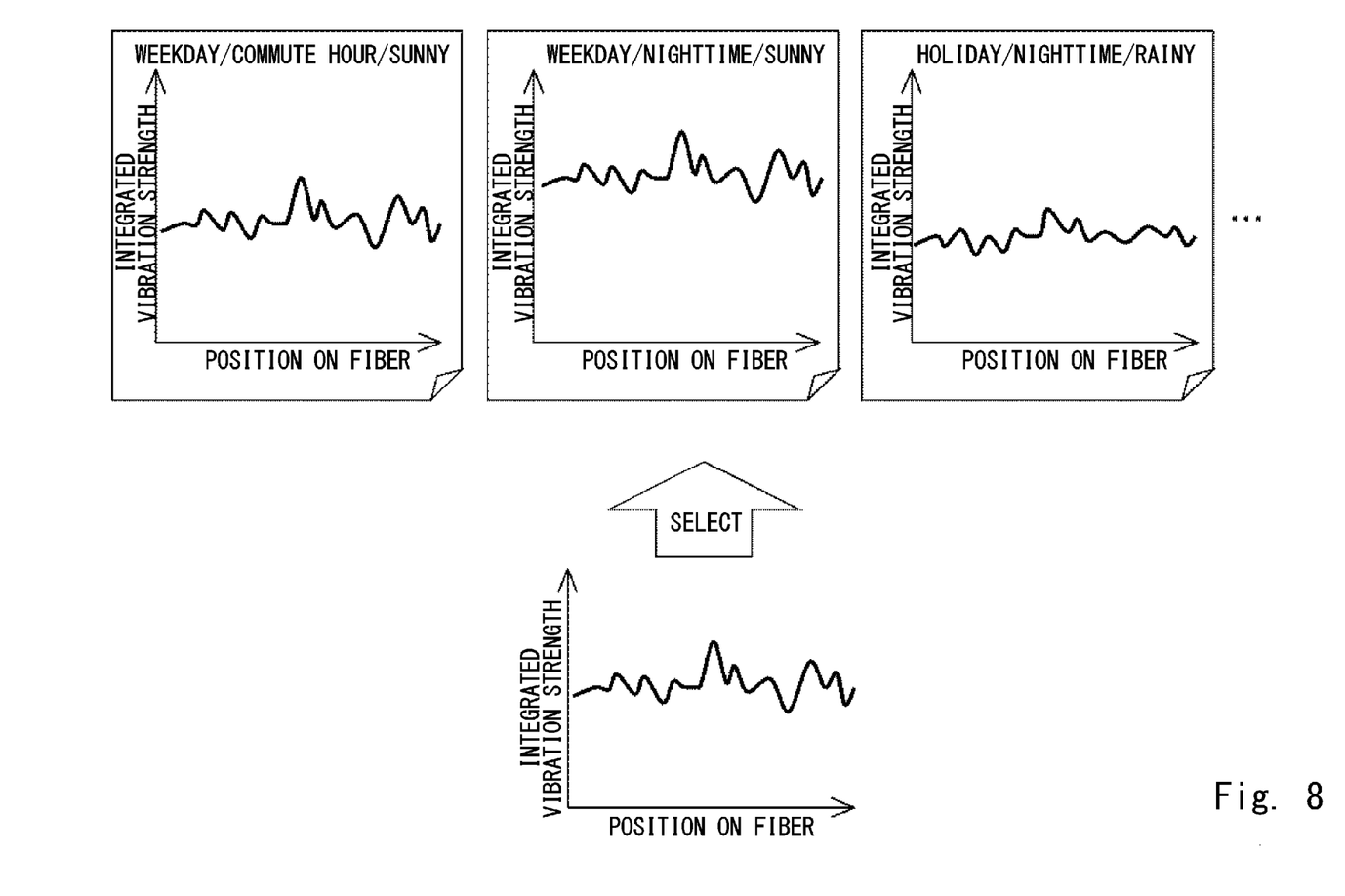
FIG. 8 is an illustration diagram showing a measurement data processing method in a structure deterioration detection system according to a second example embodiment.

FIG. 8 is an illustration diagram showing a measurement data processing method in the structure deterioration detection system according to the second example embodiment. As shown in FIG. 8, measurement information is classified into a plurality of attributes depending on the conditions of measurement and accumulated in the information storage unit 23. The information storage unit 23 classifies measurement data on the basis of the attribute that affects the traffic situation and the level of vibration generated by vehicles, such as weekday or holiday, daytime or nighttime, commute hour (rush hour) or off-hour, or sunny weather or rainy weather. In this manner, when the information storage unit 23 stores the integrated vibration strength, it also stores attribute information containing at least one of day of week information, hour information, and weather information at the same time.

The deterioration determination unit 25 refers to the attribute of measurement data and compares it with the past data with the same attribute, and thereby makes a determination about road surface deterioration. For example, the deterioration determination unit 25 compares the integrated vibration strengths measured at different times and having the same attribute information. The determination flow is the same as that shown in FIG. 7.

The effect of this example embodiment is described hereinbelow. This example embodiment has the following effect in addition to the effect of the first example embodiment. Specifically, the structure deterioration detection system according to this example embodiment classifies measurement data by attributes depending on the conditions of measurement, and makes a comparison with information at a different time. This allows eliminating a difference in vibration strength that differs by attributes and extracting only a difference in vibration strength due to road surface degradation. The accuracy of detecting road surface deterioration is thereby improved. Even when the same vehicle is travelling, the measured vibration strength differs depending on the travelling speed and the weather. Therefore, simply making a comparison with the past information causes a decrease in the accuracy of determining road surface deterioration. The other effect is included in the description of the first example embodiment.

Third Example Embodiment

A structure deterioration detection system according to a third example embodiment is described hereinafter. In the above-described first and second example embodiments, an example of detecting the deterioration of a road surface by using an optical fiber cable on the side of the road is described. In this example embodiment, an example of detecting he deterioration of a railway track by using an optical fiber cable on the side of the railway track is described.

Figure 9:
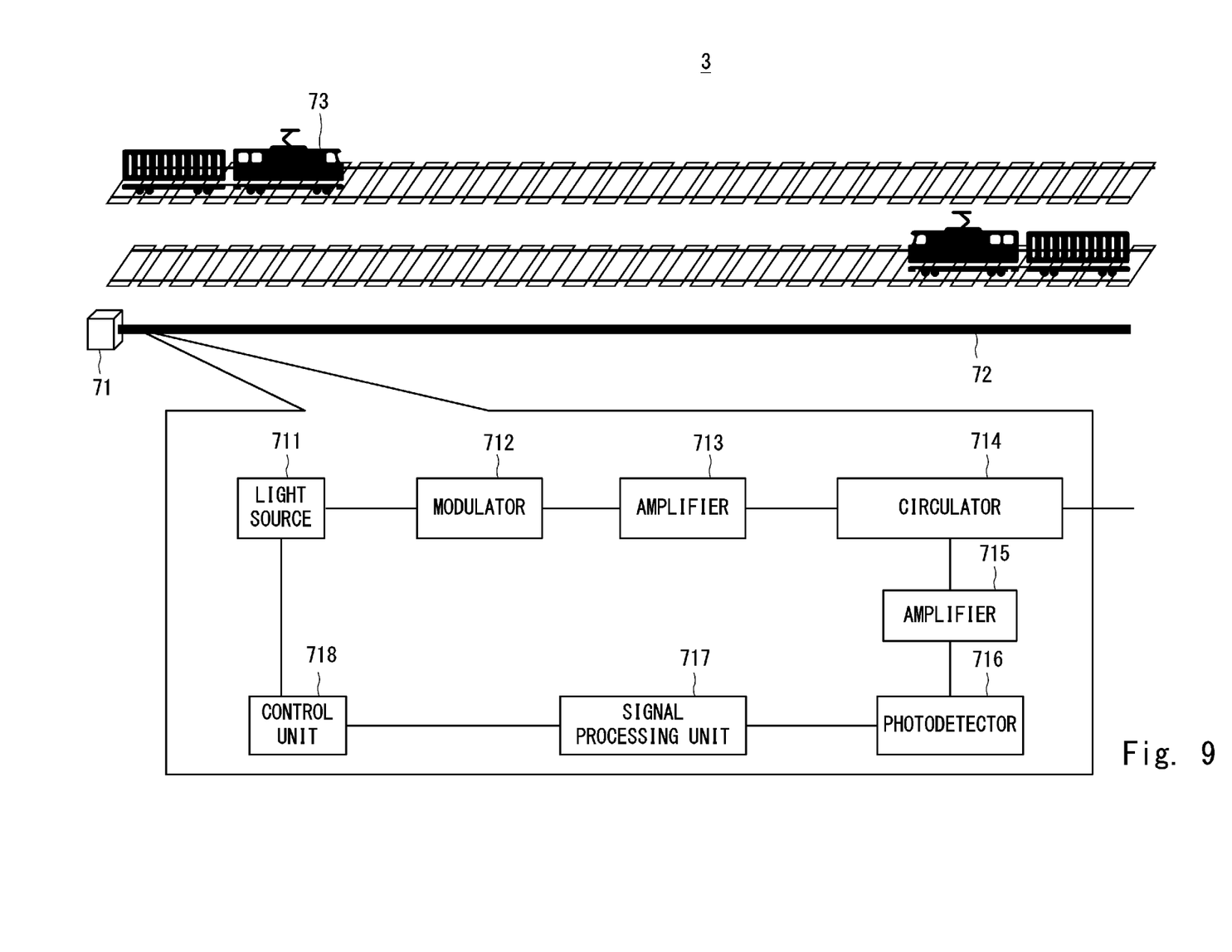
FIG. 9 is a block diagram illustrating the configuration of a structure deterioration detection system according to a third example embodiment.

FIG. 9 is a block diagram illustrating the configuration of the structure deterioration detection system according to the third example embodiment. As shown in FIG. 9, an exploration device 71 in a structure deterioration detection system 3 according to this example embodiment is connected to an optical fiber cable 72 that is laid along a railway track. The structure deterioration detection system 3 continuously measures, along the railway track, the vibration generated by a train 73 running on the railway track. The optical fiber cable 72 is a single mode fiber cable that is laid for use in communications, for example. The configurations of a light source 711, a modulator 712, an amplifier 713, a circulator 714, an amplifier 715, a photodetector 716, a signal processing unit 717, and a control unit 718 of the exploration device 71 are the same as the configurations of the light source 111, the modulator 112, the amplifier 113, the circulator 114, the amplifier 115, the photodetector 116, the signal processing unit 117, and the control unit 118 of the exploration device 11. Further, the configurations of the elements of a signal processing unit 717 are the same as the configurations of the elements of the signal processing unit 117.

The operation of the structure deterioration detection system according to this example embodiment is the same as that described in the first example embodiment except for the operation of the deterioration determination unit 25. The deterioration determination unit 25 makes a determination about defects in a railway track instead of road surface deterioration.

The structure deterioration detection system according to this example embodiment is capable of detecting defects in a railway track instead of road surface deterioration.

Note that the present disclosure is not limited to the above-described example embodiments and can be modified as appropriate without departing from the spirit and scope of the present disclosure.

For example, a combination of the configurations of the first to third example embodiments is also included in the scope of the technical idea of this example embodiment. Further, the following program that causes a computer to execute a structure deterioration detection method according to the first to third example embodiments is also included in the scope of the technical idea.
(Supplementary Note 1)
  A structure deterioration detection program causing a computer to perform:
    continuously detecting vibration along a longitudinal direction of a structure by a sensor unit placed along the longitudinal direction of the structure; and
    processing detected vibration, wherein
      when processing the detected vibration, the program causes the computer to perform:
      measuring a strength of the detected vibration by a measurement unit,
      integrating a measured vibration strength for a specified period of time by an integration unit,
      storing an integrated vibration strength by a storage unit, and
      making a determination about deterioration of the structure by comparing integrated vibration strengths at different times by a determination unit.
(Supplementary Note 2)
  The structure deterioration detection program according to Supplementary Note 1, wherein
    the vibration is generated when at least one moving body is moving along the structure, and
    when processing the detected vibration, the program causes the computer to measure the number of moving bodies by a measurement unit.
(Supplementary Note 3)
  The structure deterioration detection program according to Supplementary Note 1 or 2, wherein
    when storing the integrated vibration strength by the storage unit, the program causes the computer to simultaneously store attribute information containing at least one of day of week information, hour information, and weather information, and
    when making a determination about deterioration of the structure, the program causes the computer to compare the integrated vibration strengths at different times and having the same attribute information by the determination unit.
(Supplementary Note 4)
  The structure deterioration detection program according to any one of Supplementary Notes 1 to 3, wherein when making a determination about deterioration of the structure, the program causes the computer to compare a ratio of the integrated vibration strengths at different times with a predetermined threshold by the determination unit.
(Supplementary Note 5)
  The structure deterioration detection program according to any one of Supplementary Notes 1 to 4, wherein when making a determination about deterioration of the structure, the program causes the computer to compare a ratio of the integrated vibration strengths at different times and at a specified measurement point with the integrated vibration strengths at different times and at another measurement point.

REFERENCE SIGNS LIST 1, 3 Structure Deterioration Detection System
11, 71, 81 Exploration Device
12, 72, 82 Optical Fiber Cable
13 Vehicle
21 Vibration Measurement Unit
22 Vehicle Count Unit
23 Information Storage Unit
24 Per Unit Time Integration Unit
25 Deterioration Determination Unit
73 Train
111, 711 Light Source
112, 712 Modulator
113, 115, 713, 715 Amplifier
114, 714 Circulator
116, 716 Photodetector
117, 717 Signal Processing Unit
118, 718 Control Unit

What is claimed is:
1. A structure deterioration detection system comprising:
  a sensor unit placed along a longitudinal direction of a structure and configured to continuously monitor the structure to detect any vibration along the longitudinal direction of the structure, the vibration being generated when at least one moving body is moving along the structure;
  a measurement unit configured to measure a strength of a detected vibration;

an integration unit configured to integrate the strength for a specified period of time;

a storage unit configured to store the integrated vibration strength;

a count unit configured to measure the number of moving bodies; and a determination unit configured to make a determination about whether deterioration of the structure has occurred by a variation of values by standardizing integrated vibration strengths by the number of moving bodies at different times.

2. The structure deterioration detection system according to claim 1, wherein the storage unit is configured to, if the storage unit stores the integrated vibration strength, the storage unit simultaneously stores attribute information containing at least one of day of week information, hour information, and weather information, and the determination unit compares the values obtained by standardizing the integrated vibration strengths by the number of moving bodies at different times and having the same attribute information.

3. The structure deterioration detection system according to claim 1, wherein the determination unit compares a ratio of the values obtained by standardizing the integrated vibration strengths by the number of moving bodies at different times with a predetermined threshold.

4. The structure deterioration detection system according to claim 1, wherein the determination unit compares a ratio of the values obtained by standardizing the integrated vibration strengths by the number of moving bodies at different times and at a specified measurement point with the ratio of the values obtained by standardizing the integrated vibration strengths by the number of moving bodies at different times and at another measurement point.

5. A structure deterioration detection method comprising:
a step of continuously monitoring a structure to detect any vibration along a longitudinal direction of the structure by a sensor unit placed along the longitudinal direction of the structure, the vibration being generated when at least one moving body is moving along the structure;

a step of measuring a strength of the detected vibration by a measurement unit;

a step of integrating a measured vibration strength for a specified period of time by an integration unit;

a step of storing an integrated vibration strength by a storage unit;

a step of measuring the number of moving bodies by a count unit; and a step of making a determination about whether deterioration of the structure has occurred by a variation of values obtained by standardizing integrated vibration strengths by the number of moving bodies at different times by a determination unit.

6. The structure deterioration detection method according to claim 5, wherein in the step of storing the integrated vibration strength by the storage unit, attribute information containing at least one of day of week information, hour information, and weather information is simultaneously stored, and in the step of making a determination about whether deterioration of the structure has occurred, the values obtained by standardizing the integrated vibration strengths by the number of moving bodies at different times and having the same attribute information are compared by the determination unit.

7. The structure deterioration detection method according to claim 5, wherein in the step of making a determination about whether deterioration of the structure has occurred, a ratio of the values obtained by standardizing the integrated vibration strengths by the number of moving bodies at different times is compared with a predetermined threshold by the determination unit.

8. The structure deterioration detection method according to claim 5, wherein in the step of making a determination about whether deterioration of the structure has occurred, a ratio of the values obtained by standardizing the integrated vibration strengths by the number of moving bodies at different times and at a specified measurement point is compared with the ratio of the values obtained by standardizing the integrated vibration strengths by the number of moving bodies at different times and at another measurement point.

9. A non-transitory computer-readable medium that stores a structure deterioration detection program causing a computer to perform:

continuously monitoring a structure to detect any vibration along a longitudinal direction of the structure by a sensor unit placed along the longitudinal direction of the structure, the vibration being generated when at least one moving body is moving along the structure;

measuring a strength of the detected vibration by a measurement unit;

integrating a measured vibration strength for a specified period of time by an integration unit;

storing an integrated vibration strength by a storage unit;

measuring the number of moving bodies by a count unit; and making a determination about whether deterioration of the structure has occurred by a variation of values obtained by standardizing integrated vibration strengths by the number of moving bodies at different times by a determination unit.

10. The non-transitory computer-readable medium that stores the structure deterioration detection program according to claim 9, wherein when storing the integrated vibration strength by the storage unit, the program causes the computer to simultaneously store attribute information containing at least one of day of week information, hour information, and weather information, and when making a determination about whether deterioration of the structure has occurred, the program causes the computer to compare the values obtained by standardizing the integrated vibration strengths by the number of moving bodies at different times and having the same attribute information by the determination unit.

11. The non-transitory computer-readable medium that stores the structure deterioration detection program according to claim 9, wherein when making a determination about deterioration of the structure has occurred, the program causes the computer to compare a ratio of the values obtained by standardizing the integrated vibration strengths by the number of moving bodies at different times with a predetermined threshold by the determination unit.

12. The non-transitory computer-readable medium that stores the structure deterioration detection program according to claim 9, wherein when making a determination about whether deterioration of the structure has occurred, the program causes the computer to compare a ratio of the values obtained by standardizing the integrated vibration strengths by the number of moving bodies at different times and at a specified measurement point with the ratio of the values obtained by standardizing the integrated vibration strengths by the number of moving bodies at different times and at another measurement point.

* * * * *